March 8, 1966  J. J. McCABE  3,239,806
ALERTING APPARATUS FOR VEHICLE DIRECTIONAL SIGNALLING SYSTEMS
Filed Oct. 7, 1963  4 Sheets-Sheet 3
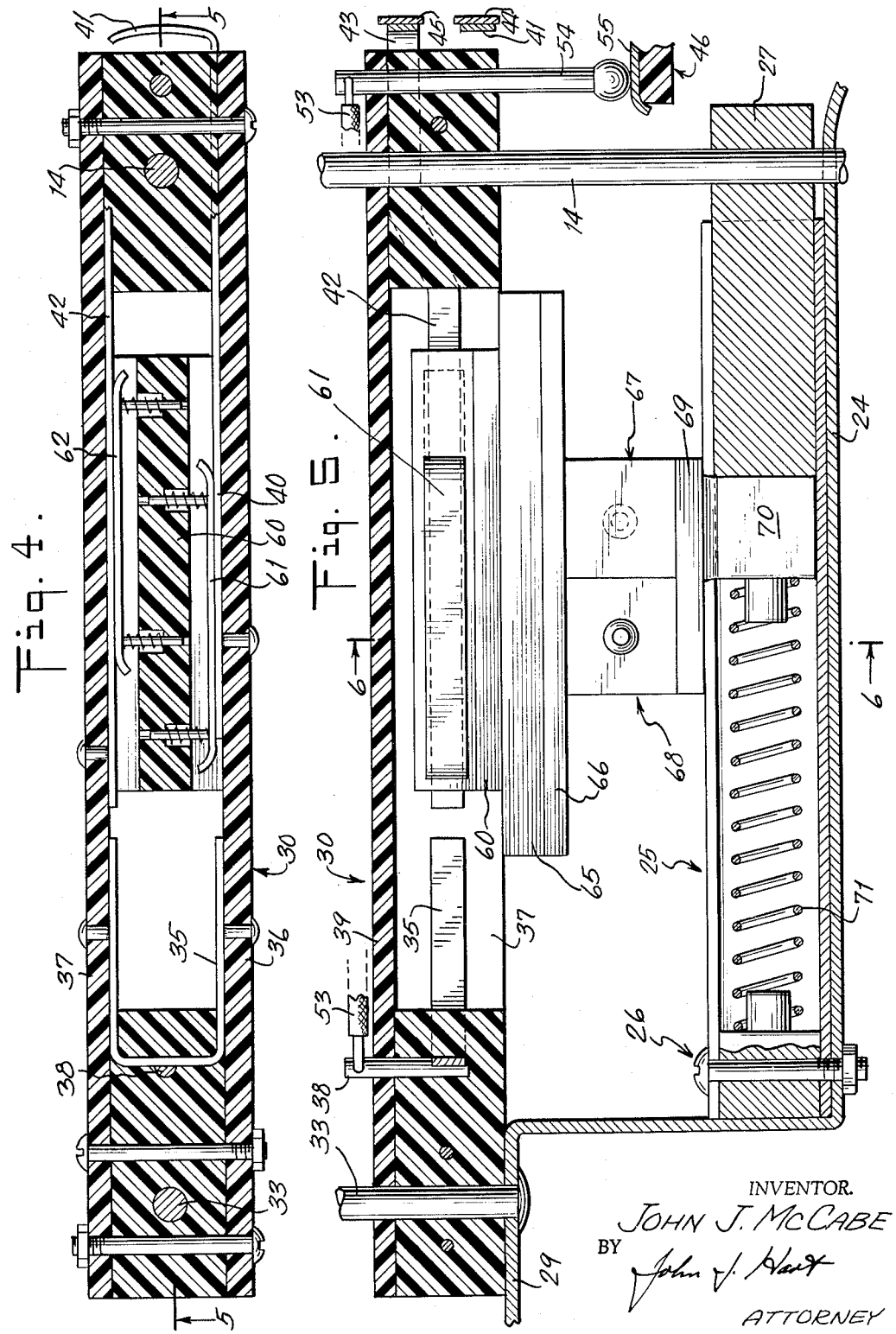
INVENTOR.
JOHN J. McCABE
BY
ATTORNEY

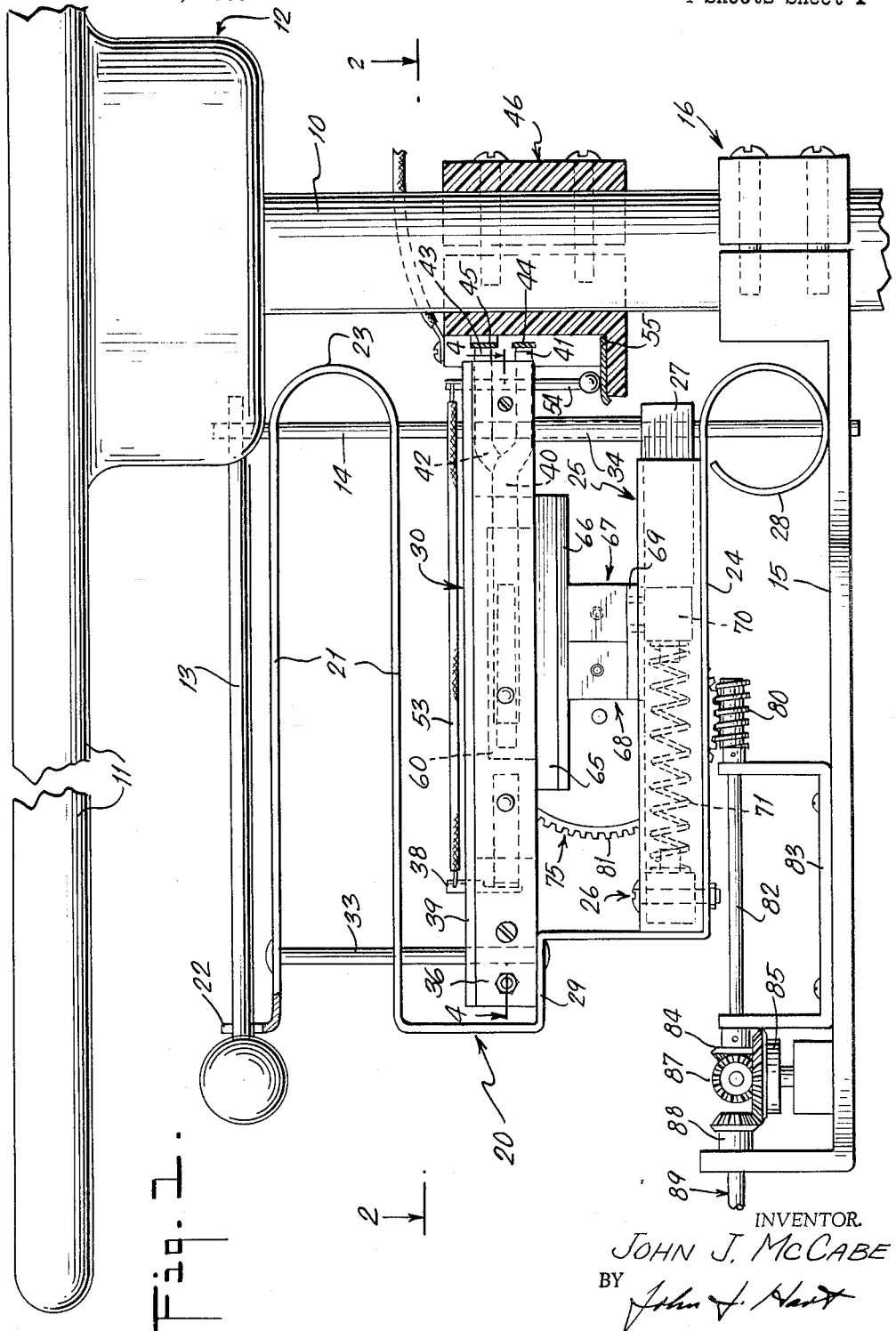

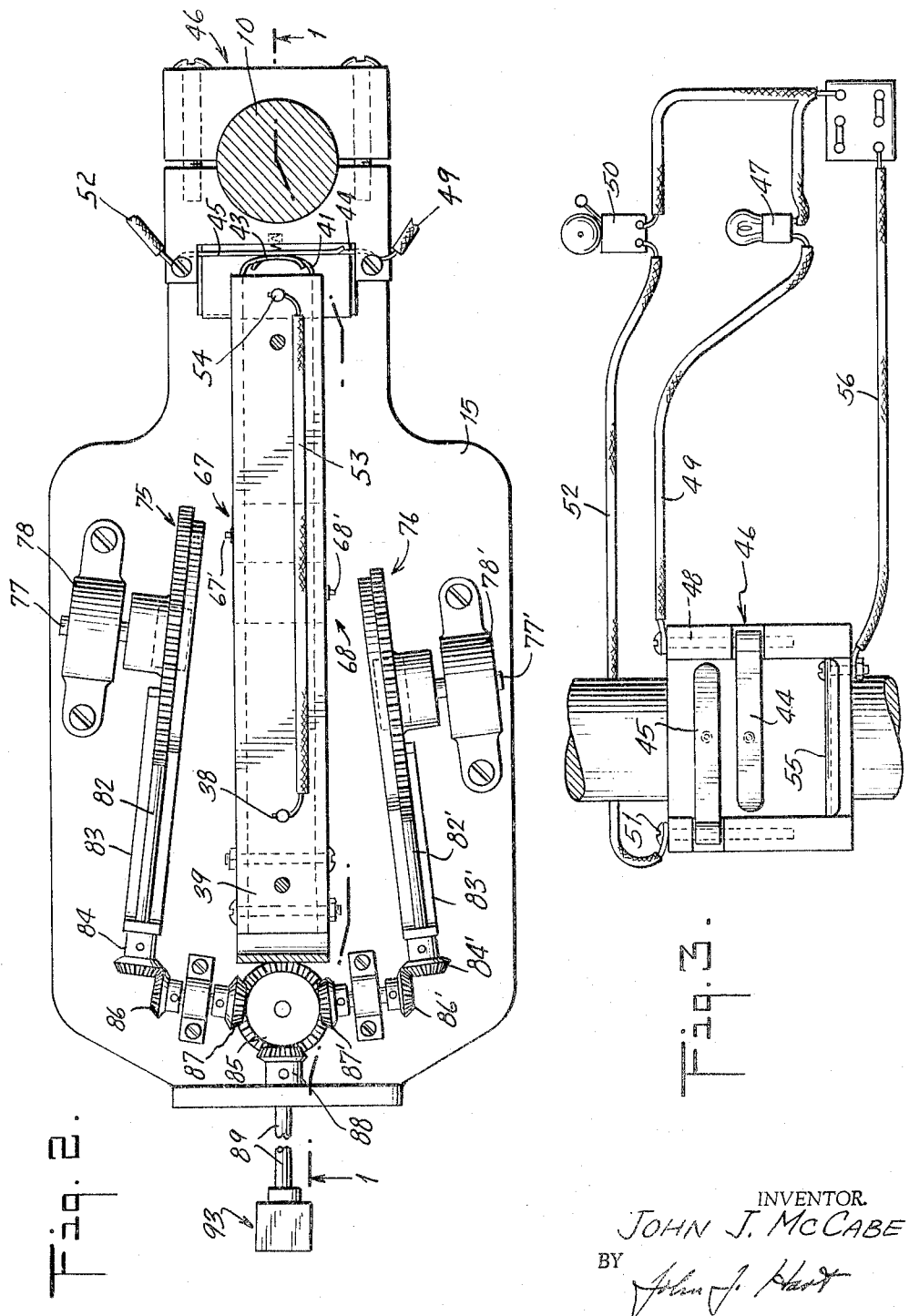

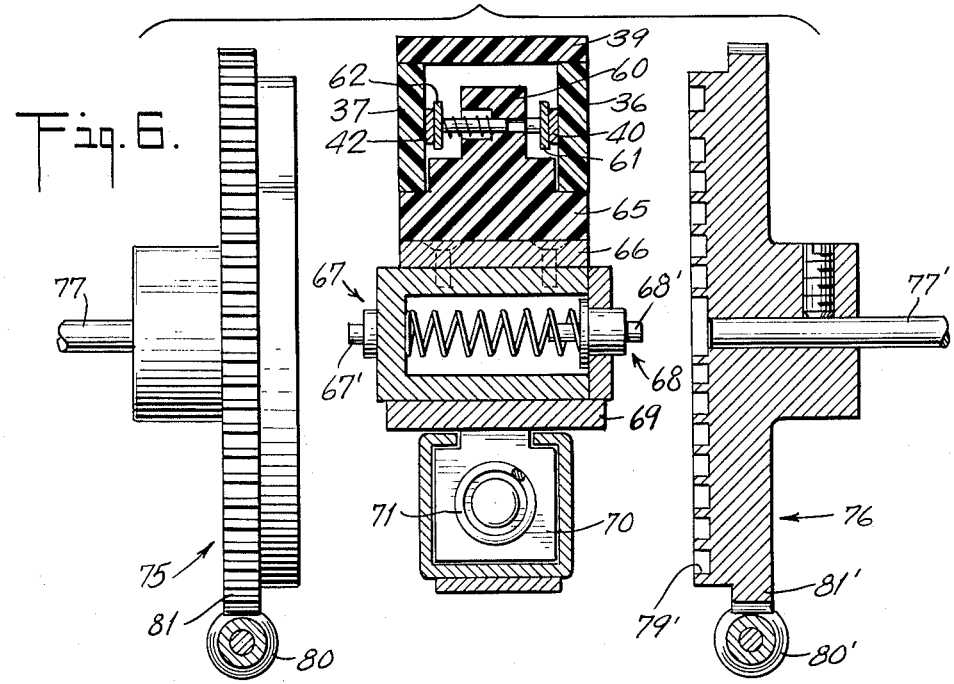
Fig. 6.
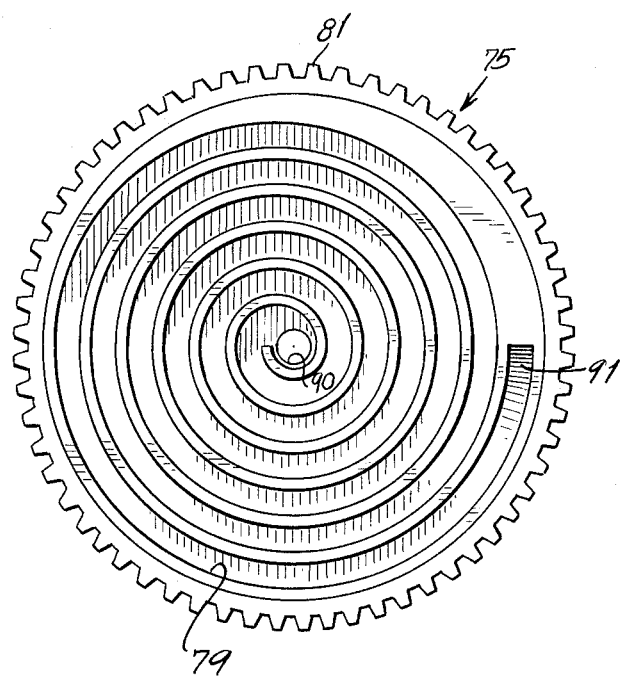
Fig. 7.
INVENTOR.
JOHN J. McCABE
BY
ATTORNEY 3,239,806
ALERTING APPARATUS FOR VEHICLE DIRECTIONAL SIGNALLING SYSTEMS
John J. McCabe, 140 E. 28th St., New York, N.Y.
Filed Oct. 7, 1963, Ser. No. 314,241
6 Claims. (Cl. 340—55)

This invention relates to the directional signal systems that are installed on motor vehicles to indicate the direction in which the operators thereof desire to turn, and the primary purpose of the invention is to provide a warning device which will promote motor vehicle safety by reducing the present misunderstanding and confusion existing between drivers, and drivers and pedestrians, caused by the flashing of known directional signal systems when no turn is intended.

The occurrence of these unintended flashings in existing directional signal systems are due principally to the construction of the later. Thus, the means usually included in these systems for returning the manually operated signal lever to its neutral position after a turn has been completed, can only operate to effect this result if the front wheels of the vehicle in making a turn have been turned far enough to the right or left to set such means so that it can operate to return the signal lever. Accordingly, when a careful driver, traveling at a high rate of speed, moves gradually from one lane to another, the angle of "incidence" is generally too small to set the lever operating means and his directional signal will continue to flash unless the lever is manually returned to neutral position. This also occurs frequently when a car makes a wide sweeping turn off at a forked intersection or at an exit road of a turnpike. Many existing indicator systems are also so constructed that they are not sufficiently effective and reliable to preclude the possibility of an unintentional signal. It is true, that most of these systems are equipped with some means intended to bring the operator's attention to the fact that the system is flashing. However, the clicking means provided on many present systems, is frequently drowned out by the noise of the motor, the din of the traffic, the conversation of the driver and passengers, and the sounds and noises from radios, and occasionally from railroads, aircraft, factories, etc. The small flashing light provided on the wheel or dashboard in many installations, is often invisible, especially during daylight, and constitutes a traffic hazard because it must distract the attention of the driver from the road. This is especially so when the car is traveling at a high rate of speed on a crowded highway because even a fraction of a second of inattention may prove harmful to the safety of the driver and that of others with him.

In accordance with the present invention the driver's directional signal warning system is provided with means in the nature of distance measuring means which is put into operation when the operator actuates the signal lever preparatory to making a turn, and will be rendered inoperative to activate a warning signal if the signal lever is returned to neutral position by the usual lever operating means after the vehicle has traversed a given distance allowing for the distance the vehicle would reasonably take for signalling and completing a turn. If the vehicle proceeds without making the signalled turn, or if the signal lever has not been tripped and returned to its neutral position after the signalled turn has been completed, the means of this invention will operate initially to activate a warning light located in a prominent place where it may readily be seen by the operator, and then after the vehicle has traversed a second given distance after the actuation of the warning light, such means will operate to activate a buzzer to warn the driver orally that the flashing light of the signal system is still operating. The means of this invention may readily be adapted to the directional signalling systems already provided on existing vehicles and may form an auxiliary or integral part of newly constructed signalling systems.

For a better understanding of the invention as well as the novel features of novelty thereof, attention is directed to the following description which should be read in connection with the accompanying drawings, in which FIG. 1 is an elevational view, partly in section, looking along the line 1—1 of FIG. 2 and shows a directional signalling system of known construction mounted in its customary fashion on the steering post of a vehicle and having combined therewith the warning device of this invention;

FIG. 2 is a horizontal sectional view taken along the line 2—2 in FIG. 1;

FIG. 3 is an enlarged, elevational view illustrating the manner in which the warning light and buzzer are connected in the system;

FIG. 4 is an enlarged, horizontal, sectional view taken along the line 4—4 of FIG. 1 and showing the switch mechanism for controlling the buzzer and light circuits;

FIG. 5 is a vertical sectional view taken along the line 5—5 of FIG. 4;

FIG. 6 is a sectional view taken along the line 6—6 of FIG. 5 and showing the relation of the switch mechanism with the spiral cam for actuating the same when the signal lever is actuated to signal a right or left turn; and FIG. 7 is a side elevational view of the working cam face of one of the spiral cams.

In the drawings, the reference numeral 10 designates the steering post of a steering wheel 11 in a motor vehicle. Mounted on the steering post is a directional signalling device 12 of known construction and comprising, as is usual, a signal lever 13 and, as is customary in such devices, a detent or other holding device (not shown) for returning the signal lever to its neutral position after the vehicle has made the change of direction for which the signal was given. The signal lever 13 is connected at its inner end to a vertical rod 14 pivotally supported at its upper end by the housing of signalling device 12 and at its lower end by a bracket 15 secured as by a clamp 16 to the steering post 10.

Located between the signal lever 13 and bracket 15 is a vertically disposed supporting bracket 20 made from a strip of metal formed to provide a loop shaped upper end 21 having the outer end 22 of its upper leg bent upwardly and slotted to receive the outer end of the signal lever 13, and having aligned apertures provided in both legs adjacent to the looped inner end 23 thereof and through which extends the rod or post 14. The lower leg of the loop shaped upper end 21 forms the upper leg of a reversely bent substantially U-shaped lower portion, the lower leg 24 of which functions as a support for a slide track 25 connected at its outer end to such lower leg 24 by a nut and bolt 26, and at its inner end to the post 14 which extends through a block 27 provided at the inner end of track 25 and the circular terminal end 28 of such lower leg 24. The looped end 28 rests on the bracket 15 and serves as a spacer between such bracket 15 and the bracket 20. The closed, outer end of the U-shaped lower portion of bracket 20, is bent to provide a horizontal support 29 for the outer end of a switch device 30 and to which the latter is secured by a vertical rod 33 which extends through support 29, the outer end of the switch device 30 and through both legs of the looped upper bracket end 21, and the ends of which are upset to permanently secure it in position thereon. Thus the rod 13 in addition to securing the outer end of the switch device 30 in position on the bracket supporting portion 29, braces the outer ends of the three legs of bracket 20. The rod 14 extends through the inner end of the switch device 30 which is supported on a level with its outer end, by a spacing member 34 provided on rod 14 between such device 30 and the block 27 of the slide track 25.

It will be understood from the foregoing, that as the signal lever is moved in either one direction or the other from its neutral position, the rod 14 will be rotated therewith, and the bracket 20 will be pivoted therewith about the vertical longitudinal axis of rod 14 and relative to the bracket 15, the switch device 30 and the associated slide track 25 being carried by the bracket 20 and likewise pivoting about the longitudinal axis of rod 14 to bring the switch device into coactive engagement with switch operating means located on both sides thereof as hereinafter will become more clear.

The switch device 30 includes a hollow housing made of strips of suitable non-conducting plastic material, such as Lucite, to the outer ends of the side walls 36, 37 of which is secured a U-shaped copper strip 35 provided with a binding post 38 which extends vertically upwardly through the top wall 39 of such housing. Connected to the inside surface of housing side wall 36 in spaced aligned relation to one leg of the U-shaped strip 35, is a copper strip 40 which extends inwardly throughout the remaining length of the housing and projects from the inner end of such housing to terminate in an arc-shaped contact 41. Connected to the inside surface of housing side wall 37 in spaced aligned relation to the other leg of the U-shaped strip 35, is a copper strip 42 which extends to the inner end of the housing and projects inwardly from the latter in the form of an arc-shaped contact 43. It will be noted that the lengths of the two legs of the U-shaped strip 35 are substantially the same and that the outer end of the strip 42 is spaced a shorter distance from the end of its associated leg thereof than the outer end of strip 40 is spaced from its associated leg of the U-shaped strip 35.

The contacts 41 and 43 on the contact strips 40 and 42, respectively, engage free swinging metal strips 44 and 45, respectively, provided on a plastic block 46 secured to the steering post 10. The strip 44 is electrically connected in an electrical circuit containing a lamp 47 through a binding post 48 and a conductor wire 49. The strip 45 is electrically connected to a buzzer 50 arranged in parallel to the lamp in such circuit, through a binding post 51 and a conductor wire 52. The U-shaped strip 35 is connected in said circuit by a conductor wire 53 connected at one end to the binding post 38 engaging such strip, and connected at its other end to the upper end of a spring pressed binding post 54 extending vertically through the inner end of the switch device 30 and engaging a horizontal contact plate 55 which is provided on said block 46 and which is electrically connected to a conductor wire 56.

Slidably mounted in the housing of the switch device 30 between the contact strips 40, 42 is a movable part composed of an elongated member 60 of non-conducting plastic material having provided on the sides thereof elongated spring pressed contact shoes 61, 62 slidably engageable with the strips 40, 42, respectively. It will be noted that the shoes 61, 62 are displaced longitudinally to enable shoe 61 to close the space between strip 40 and the associated leg of the U-shaped strip 35, before the shoe 62 can close the space between strip 42 and the other leg of such strip 35 as the movable part is being advanced following an operation of the signal lever 13, as to the left as viewed in FIG. 4 of the drawings. It will be understood from the foregoing discussion of the electrical parts associated with the strips 40 and 42, that when the contact shoe 61 closes the space or gap between strip 40 and strip 35, current will flow through strip 35, conductor 53, post 54, plate, 55, wire 56, lamp 47, conductor 49, contact strip 44 and strip 40 to light the lamp 47. When the contact shoe 62 closes the space or gap between strip 42 and strip 35, current will flow through strip 35, conductor 53, post 54, plate 55, wire 56, buzzer 50, conductor 52, contact strip 45 and strip 42 to activate the buzzer 50.

The member 60 of the movable switch part constitutes the uper part of an integral block 65 of non-conducting plastic material that extends below the housing of the switch device 30. Secured to the bottom of the block 65 in any suitable manner is a metal plate 66, on the underside of which, are provided a pair of transverse, oppositely disposed, spring pressed cam members 67, 68. Secured to the underside of the cam members 67, 68, is a slide plate 69 that rides on the upper slotted wall of the hollow slide track 25 and carries a guide block 70 that slidably moves within the hollow slide track 25 and is normally biased to retracted position by a spring 71. It will thus be seen that the member 60 of block 65 will be supported for slidable movement within the housing of switch device 30 by plate 66, cam members 67, 68, slide plate 69, the slide track 25 and the leg 24 of bracket 20, and that such member 60 will be normally biased to retracted position within such switch device housing by the spring 71 associated with the slide track 25, and by the guide block 70 connected to slide plate 69.

The means for advancing the member 60 in the housing of the switch device 30 against the tension of spring 71 comprises the cam members 67 and 68, one of which comes into driven engagement with one of a pair of spiral cams 75, 76 respectively, depending on which direction the signal lever 13 is moved from its neutral position. The cams 75, 76 are arranged in oppositely disposed relation on opposite sides of the switch device 30 and are secured to shafts 77, 77', respectively, rotatably supported supported by bearings 78, 78' mounted on bracket 15. As will be observed from a comparison of FIGS. 2 and 6 of the drawings, the arrangement of the cams 75, 76 are such that the axes of shafts 77, 77' are located in a horizontal plane containing the longitudinal axes of the cam pins 67', 68' of the cam members 67, 68, respectively, and are angularly disposed in such offset relation that when the signal lever is moved from neutral position to indicate the two directions in which the vehicle may turn, the cam pins 67', 68' on such movements of the lever will move toward the cams 75, 76 and enter the start of cam grooves 79, 79' provided in the respective opposed faces of such cams. One of the cams 75, 76 is a left hand cam and the other is a right hand cam so that whichever cam pin 67', 68' is connected to its associated cam the member 60 will be advanced as such cam is rotated.

While the vehicle is in operation the cams 75, 76 are rotated in synchronism with the forward movements and stoppages thereof. As is shown in the drawings, the means for so rotating the cams may comprise worms 80, 80', engaging worm gears 81, 81' forming part of the cams 75, 76 and mounted on one end of shafts 82, 82' supported on bearing brackets 83, 83' secured to the bracket 15. Secured to the other ends of shafts 82, 83' are bevel gears 84, 84' which are drivenly connected to a horizontal gear 85, through gears 86, 86' and 87, 87'. Gear 85 may be connected by a gear 88 and a member 89 which may be constituted of a flexible cable, rigid shaft or any other suitable connecting means, to any part of the vehicle having a motion synchronous with the forward motion and stoppage of the vehicle so that so long as such vehicle part is actuated, gear 85 will be rotated in synchronism therewith; such vehicle part being indicated generally in FIG. 2 of the drawings by the numeral 93 and being constituted of either the speedometer, drive shaft, drive gear, differential, transmission, tire wheel, tire or any other suitable part of the vehicle having the aforesaid motion.

It will be understood from the foregoing description of the parts, that when the signal lever 13 is moved in the proper direction from its neutral position to signal the turn the operator desires to make, the bracket 20 and consequently the switch device 30 and the associated slide track 25 will be pivoted about the vertical axis of the post 14 to bring one of the cam pins 67', 68' into engagement with the outermost convolution of one of the grooves 79, 79' in use of the cams 75, 76. The movable part of the switch device 30 will at the time of such engagement, be held in a retracted position by the spring 71. As the cams 75, 76 are being rotated in synchronism with the forward movement of the vehicle, the rotating spiral cam groove of the cam with which one of the cam pins is in contact, will force the engaged pin toward the center of the cam and thereby advance the movable switch part against the tension of the spring 71. When the contact shoe 60 closes the gap between the contact strip 40 and the U-shaped strip 35, the circuit for the lamp 47 will be closed to activate the lamp 47. The parts may be so constructed and arranged that this occurs when the engaged pin 67' or 68' has traveled halfway toward the center of the engaged cam. The contact shoe 62 on the movable switch part will close the gap between the contact strip 42 and the associated leg of the U-shaped strip 35 to activate the buzzer 50 when the engaged pin has substantially reached the center of the engaged cam. The parts may be so designed that the distance traversed by the vehicle, as indicated by the speedometer, will be approximately 400 feet when the lamp 47 is lighted, and about 800 feet when the buzzer 50 is activated. However, it is within the contemplation of the invention to select any other distances that may be considered safe for signalling and completing a turn. The device can be readily adapted to a wide range of such distances simply by selecting a spiral cam of the proper diameter or by changing the length of the gap between the U-shaped copper strip 35 and the copper strips 40 and 42, or by changing the ratio of the worm gear sets 80, 81 and 80', 81'. At its center, each of the cams 75, 76 is provided with a recessed hole 90, in FIG. 7, into which the engaged cam pin 67', 68' is pushed by its associated spring when it reaches such point of the engaged cam, to hold the movable switch part in its advanced position thereby maintaining the lamp 47 and buzzer 50 activated until the signal lever is returned to its neutral normal position, either by the tripping of the associated detent or other holding device provided in the particular system for this purpose, or by the manual operation thereof by the operator of the vehicle. It will be apparent that since the cam pin can be readily disengaged from the cam groove at any point of its travel in the latter by the operator returning the signal lever 13 to its neutral position, the light 47 and buzzer 50 can be rendered inoperative at the will of the operator. The outer end of the groove of each cam is preferably made sloping, as indicated by the numeral 91 in FIG. 7 to enable the engaged cam pin to ride up such slope and drop without damage back into the outside convolution of such cam groove, in the event the rotary motion of the cam is reversed, as when the vehicle is put in reverse gear, while the parts are so interengaged, thereby preventing damage to such cam pin, or the moving interior part of the slide switch.

It will be understood from the foregoing that the device of this invention is adaptable to all known directional signal systems and is not confined to those which are located on one side of the steering post of the vehicle. Also while I have illustrated in the drawings and described hereinabove a practical form in which the invention may be practiced, it will be understood that the device herein disclosed need not be mounted on the steering post of the vehicle, but may be placed in any convenient location in the vehicle. The device need not be operated from a part of the vehicle as disclosed, but may be operated by any suitable mechanical and electrical system capable of providing a motion which is synchronous with the forward movement and stoppage of the vehicle. Further, it will be evident that the device may be so utilized that the hand motion of the driver to activate the signal can have the secondary purpose of engaging the spiral cam and slide switch assembly and the action of the vehicle can have the secondary purpose of disengaging them. It will also be apparent to those skilled in the art that the disclosed embodiment may be changed and modified without departing from the spirit of the invention or the scope of the appended claims.

I claim:

1. Driver's directional signal alerting apparatus for use with a vehicle directional signalling system and comprising signalling means operable to warn the driver of an actively operating directional signal, means for actuating said signalling means after the vehicle has traversed a given distance from the place of initiation of the directional signal including a first means having a movement synchronous with the forward movement of the vehicle, second means connectable in driven relation to said first means and movable through a given path at a rate of movement imparted thereto by said first means, means activated by said second means when the latter travels a given distance along said given path to actuate said signalling means, and means for connecting said second means in driven relation to said first means when the directional signal is initiated.

2. Apparatus such as defined in claim 1, in which said first means comprises a rotatable cam having a spiral groove therein and means for rotating said cam synchronously with the forward movement of the vehicle, in which said second means includes a slidable switch element carrying a cam pin engageable in said cam groove and movable along said given path as said pin is moved by the rotating spiral groove of said cam, and in which said means activated by said second means comprises switch means controlled by said slidable switch element and contained in a circuit including said signalling means, said activatable means being activated by said slidable switch when the latter has traveled said given distance along said given path.

3. Apparatus such as defined in claim 2, in which said switch means comprises an elongated contact member included in said circuit and having a non-conductive gap at a given place in the length thereof, and in which said slidable switch element carries a conducting shoe engageable with said contact member and of a length enabling it to bridge such gap in said contact member.

4. Apparatus such as defined in claim 2, including guide means connected to said slidable switch element and confining the movements thereof to said given path.

5. Apparatus such as defined in claim 2, including means normally biasing said slidable switch element to a retracted position and yieldingly permitting advancement of such element from such retracted position by said spiral cam and cam pin.

6. Apparatus such as defined in claim 1, in which said last mentioned means comprises means connecting said second means to the member of the signalling system operable by the driver to initiate the directional signal, to cause said second means on operation of said system member to initiate a directional signal, to move, thereby bringing said second means into coactable driven relation with said first means.

No references cited.

NEIL C. READ, *Primary Examiner.*